US008130658B2

(12) United States Patent
Ahn

(10) Patent No.: US 8,130,658 B2
(45) Date of Patent: Mar. 6, 2012

(54) PACKET SWITCHED DATA NETWORK (PSDN) HAVING LOCAL AREA NETWORK (LAN) INTERFACE AND OVERLOAD CONTROL METHOD THEREOF

(75) Inventor: Kwang-Jin Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 832 days.

(21) Appl. No.: 11/592,271

(22) Filed: Nov. 3, 2006

(65) Prior Publication Data

US 2007/0104117 A1    May 10, 2007

(30) Foreign Application Priority Data

Nov. 9, 2005    (KR) .................. 10-2005-0107179

(51) Int. Cl.
*G01R 31/08*    (2006.01)
*G06F 11/00*    (2006.01)
*G08C 15/00*    (2006.01)
*H04J 1/16*    (2006.01)
*H04J 3/14*    (2006.01)
*H04L 1/00*    (2006.01)
*H04L 12/26*    (2006.01)

(52) U.S. Cl. ........ 370/242; 370/236; 370/412; 370/439; 709/224; 709/225

(58) Field of Classification Search .................. 370/236, 370/412, 242, 439; 709/224, 225
See application file for complete search history.

(56) References Cited

U.S. PATENT DOCUMENTS

| | | | | |
|---|---|---|---|---|
| 4,242,753 A * | 12/1980 | Dolikian et al. ............. | 375/311 |
| 4,945,335 A * | 7/1990 | Kimura et al. ............ | 340/426.34 |
| 5,200,962 A * | 4/1993 | Kao et al. ................... | 714/774 |
| 5,291,614 A * | 3/1994 | Baker et al. .................... | 712/35 |
| 5,708,820 A * | 1/1998 | Park et al. ..................... | 713/323 |
| 5,774,468 A * | 6/1998 | Maruyama et al. .......... | 370/445 |
| 5,983,353 A * | 11/1999 | McHann, Jr. ................. | 713/310 |
| 6,018,300 A * | 1/2000 | Dowden et al. .............. | 340/635 |
| 6,055,641 A * | 4/2000 | Konaka et al. ............... | 713/320 |
| 6,574,201 B1 * | 6/2003 | Kreppel ........................ | 370/328 |
| 6,631,488 B1 * | 10/2003 | Stambaugh et al. .......... | 714/746 |
| 6,882,632 B1 * | 4/2005 | Koo et al. ..................... | 370/335 |
| 7,136,931 B2 * | 11/2006 | Natarajan et al. ............ | 709/238 |
| 7,162,667 B2 * | 1/2007 | Brazdrum et al. ............. | 714/55 |
| 7,324,540 B2 * | 1/2008 | Vangal et al. ................. | 370/419 |
| 7,406,103 B2 * | 7/2008 | Song et al. .................... | 370/508 |
| 2001/0027531 A1 * | 10/2001 | Nakamura .................... | 713/300 |
| 2002/0049933 A1 * | 4/2002 | Nyu .............................. | 714/43 |
| 2003/0133466 A1 * | 7/2003 | Shimonishi ................... | 370/412 |
| 2004/0196862 A1 * | 10/2004 | Song et al. .................... | 370/442 |

(Continued)

*Primary Examiner* — Ayaz Sheikh
*Assistant Examiner* — Peter Chau
(74) *Attorney, Agent, or Firm* — H.C. Park & Associates, PLC

(57) ABSTRACT

In a Packet Switched Data Network (PSDN) having a Local Area Network (LAN) interface, an auxiliary controller controls all protocols of the LAN interface through an interrupt routine and transmits a state-monitoring signal after processing the protocols. A main controller compares a transmitting period of the state-monitoring signal transmitted from the auxiliary controller with a critical time and changes a state of the auxiliary controller from a usable state to an unusable state or from the unusable state to the usable state in accordance with a result of the comparison. As a result, even when traffic is congested in a certain LAN interface or a certain LAN interface is infected with a virus to such an extent that the interface fails to operate, an overload in a main processor is prevented.

10 Claims, 3 Drawing Sheets

U.S. PATENT DOCUMENTS

| | | | |
|---|---|---|---|
| 2005/0008105 A1* | 1/2005 | Agazzi et al. | 375/341 |
| 2005/0025178 A1* | 2/2005 | Shirota et al. | 370/466 |
| 2005/0223113 A1* | 10/2005 | Hoffmann | 709/245 |
| 2006/0187821 A1* | 8/2006 | Watanabe et al. | 370/229 |
| 2007/0074090 A1* | 3/2007 | Trainin | 714/746 |
| 2007/0259618 A1* | 11/2007 | Nomine-Beguin | 455/12.1 |

* cited by examiner

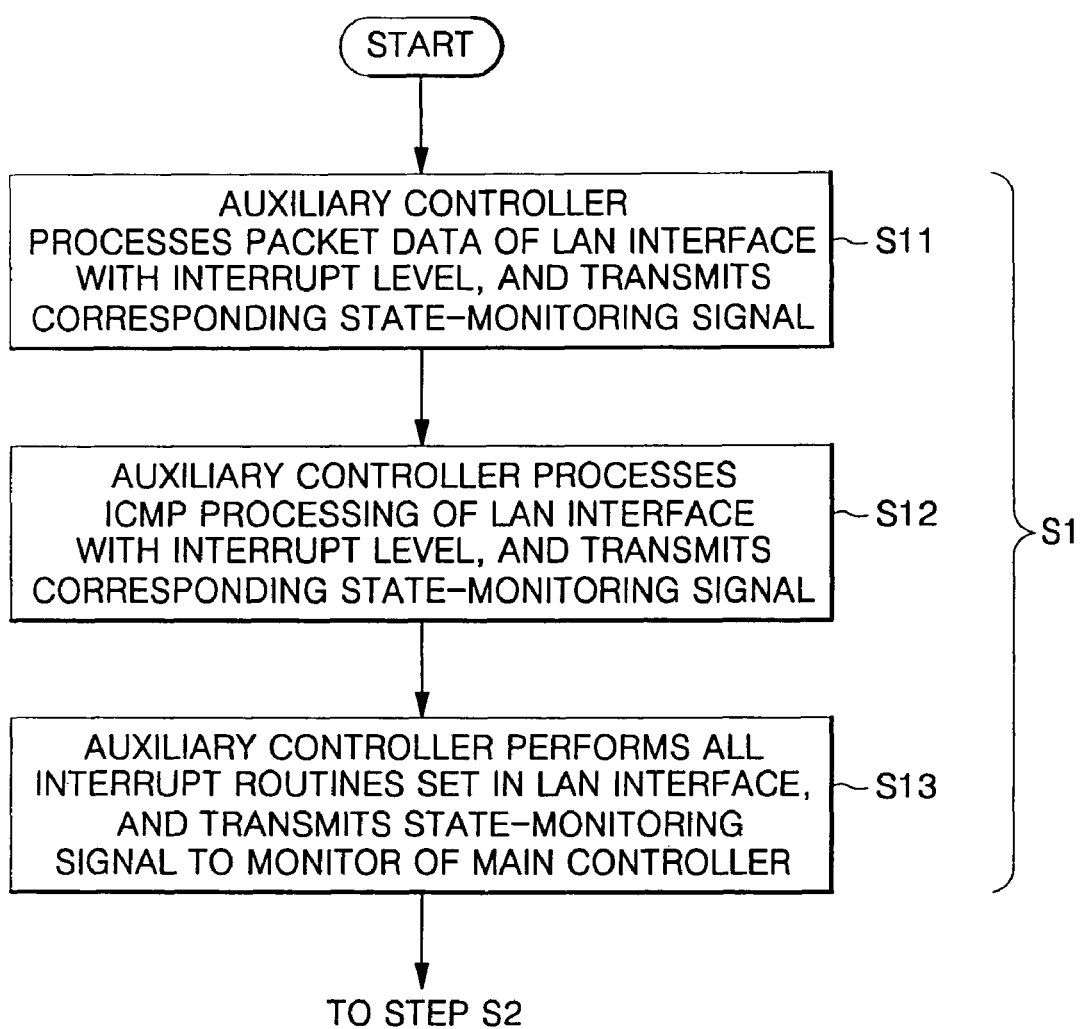

PACKET SWITCHED DATA NETWORK (PSDN) HAVING LOCAL AREA NETWORK (LAN) INTERFACE AND OVERLOAD CONTROL METHOD THEREOF

CLAIM OF PRIORITY

This application makes reference to, incorporates the same herein, and claims all benefits accruing under 35 U.S.C. §119 from an application for PACKET SWITCHED DATA NETWORK SYSTEM HAVING LAN INTERFACE AND OVERLOAD CONTROL METHOD TO THEREOF earlier filed in the Korean Intellectual Property Office on Nov. 9, 2005 and there duly assigned Serial No. 10-2005-0107179.

BACKGROUND OF THE INVENTION

1. Field of the Invention

The present invention relates to a Packet Switched Data Network (PSDN) having a Local Area Network (LAN) interface and an overload control method thereof.

2. Description of the Related Art

A Packet Switched Data Network (PSDN) is generally required for data communication. Such a PSDN is a type of communication network for data transmission operated by a public telephone company, and comprises at least one Local Area Network (LAN) interface for connection to an external subscriber terminal having a LAN interface, and a main controller for processing packet data transmitted/received from the external subscriber terminal via the LAN interface and an Internet Control Message Protocol (ICMP) as well.

The PDSN delivers sound information using a Voice over IP (VOIP) as well as a data communication between external terminals. The VoIP is a term referring to IP telephone technology for a series of equipment for transmitting sound information using an Internet Protocol (IP).

In a PSDN, a single main controller controls at least one LAN interface for maintenance and an Internet phone call, and a physical layer and data link layer thereof are realized in a LAN dedicated chip.

A conventional PSDN is operated such that the LAN interface thereof generates an interrupt routine and the main controller then controls a protocol for processing packet data to transmit/receive packet data or to process ICMP.

In such a PSDN, if heavy traffic congestion occurs in any LAN interface, an overload is generated in the main controller for controlling packet data processing and Internet phone so that the whole system may become inoperable.

Such heavy traffic congestion can also occur by hacking or viruses and so on.

The majority of hacking has been conducted against servers, but the object of the hacking has recently tended to change from servers to communication equipment. Also, viruses causing heavy traffic have increased.

However, if traffic congestion occurs in one LAN interface among one or more LAN interfaces, the conventional PSDN manages, because of the execution of an interrupt routine, the main controller of the corresponding LAN interface, which processes packet data, is overloaded by processing packet data congested in certain LAN interface, thereby hardly processing inherent functions of the other LAN interfaces and a main processor.

Accordingly, due to the processing of congested packet data, the main controller of the conventional PSDN has drawbacks in that the PSDN may operate abnormally, or the entire PSDN can become inoperable.

Furthermore, since the conventional PSDN provides "Unreachable destination" for a traffic or broadcast message for a closed port, an anti-hacking measure further has a bad effect on system stability.

Although some of LAN dedicated chips have a complementary function for MAC instrumentation, there is a problem in application thereof because a communication system by nature has to respond or not respond after receiving a message from externally accessed communication equipment.

SUMMARY OF THE INVENTION

It is, therefore, an object of the present invention to provide a Packet Switched Data Network (PSDN) having a Local Area Network (LAN) interface, which prevents an abnormal operation of the PSDN due to traffic congestion in the network and also protects the PSDN from viruses or hacking of the network, through a distributed control of LAN interface circuitry, and an overload control method thereof.

To achieve the above and other objects, in accordance with an aspect of the present invention, a PSDN having a LAN interface is provided, the PSDN including: an auxiliary controller adapted to control all protocols of the LAN interface via an interrupt routine, and to transmit a state-monitoring signal after processing the protocols; and a main controller adapted to compare a transmitting period of the state-monitoring signal transmitted by the auxiliary controller with a critical time, and to change a state of the auxiliary controller from a usable state to an unusable state or from the unusable state to the usable state in accordance with a result of the comparison.

The auxiliary controller is preferably adapted to transmit the state-monitoring signal to the main controller for each interrupt to process the protocols in the LAN interface. The auxiliary controller is adapted to transmit the state-monitoring signal to the main controller after performing all interrupt routines to process the protocols in the LAN interface.

The main controller preferably further includes a monitor adapted to store the transmitting period of the state-monitoring signal after receiving the state-monitoring signal transmitted from the auxiliary controller. The main controller preferably further includes a reset processor for comparing the transmitting period of the state-monitoring signal stored in the monitor with the predetermined critical time, and if the period is over the predetermined critical time, forcedly resetting the auxiliary controller.

To achieve the above and other objects, in accordance with another aspect of the present invention, an overload control method of a PSDN having a LAN interface is provided, the method including: periodically transmitting a state-monitoring signal to a monitor for storage after performing an interrupt routine with an auxiliary controller; determining whether or not a transmitting period of the state-monitoring signal stored is over a critical time with a main controller; and if the transmitting period of the state-monitoring signal stored in the monitor is determined to be over the critical time, then the main controller changes a state of the auxiliary controller into unusable state.

The method preferably further includes changing the unusable state of the auxiliary controller into a usable state if the transmitting period of the state-monitoring signal is below the critical time and the auxiliary controller is in the unusable state after a certain time.

The method preferably further includes allowing the main controller to maintain the state of the auxiliary controller if the transmitting period of the state-monitoring signal is below the critical time and the auxiliary controller is in a usable state.

Periodically transmitting a state-monitoring signal to a monitor for storage after performing an interrupt routine preferably includes: transmitting/receiving the packet data and transmitting the corresponding state-monitoring signal to the monitor in response to an interrupt routine for transmitting/receiving packet data generated from the LAN interface, and performing an Internet Control Message Protocol (ICMP) process to transmit the corresponding state-monitoring signal to the monitor in response to an interrupt routine for processing an ICMP generated by the LAN interface.

Periodically transmitting a state-monitoring signal to a monitor for storage after performing an interrupt routine preferably further includes transmitting the state-monitoring signal after performing all interrupt routines of the LAN interface.

Periodically transmitting a state-monitoring signal to a monitor for storage after performing an interrupt routine preferably includes changing a protocol processing transmission/receiving of the packet data among the protocols of the auxiliary controller into an unusable state if the transmitting period of the state-monitoring signal transmitted after the auxiliary controller transmits/receives the packet data is over the predetermined critical time.

Periodically transmitting a state-monitoring signal to a monitor for storage after performing an interrupt routine preferably includes changing the ICMP among the protocols of the auxiliary controller into an unusable state if the transmitting period of the state-monitoring signal transmitted after the auxiliary controller process the ICMP is over the predetermined critical time.

Periodically transmitting a state-monitoring signal to a monitor for storage after performing an interrupt routine preferably includes resetting the auxiliary controller if the transmitting period of the state-monitoring signal transmitted after performing all protocols during one period of the LAN interface is over the critical time.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein:

FIG. 3 is a flowchart of a method for allowing an auxiliary controller to transmit a state-monitoring signal in the overload control method in a PSDN having a LAN interface of FIG. 2.

DETAILED DESCRIPTION OF THE INVENTION

Hereinafter, exemplary embodiments of a Packet Switched Data Network (PSDN) having a Local Area Network (LAN) interface and an overload control method thereof according to the present invention is described in detail with reference to the accompanying drawings.

Figure 1:
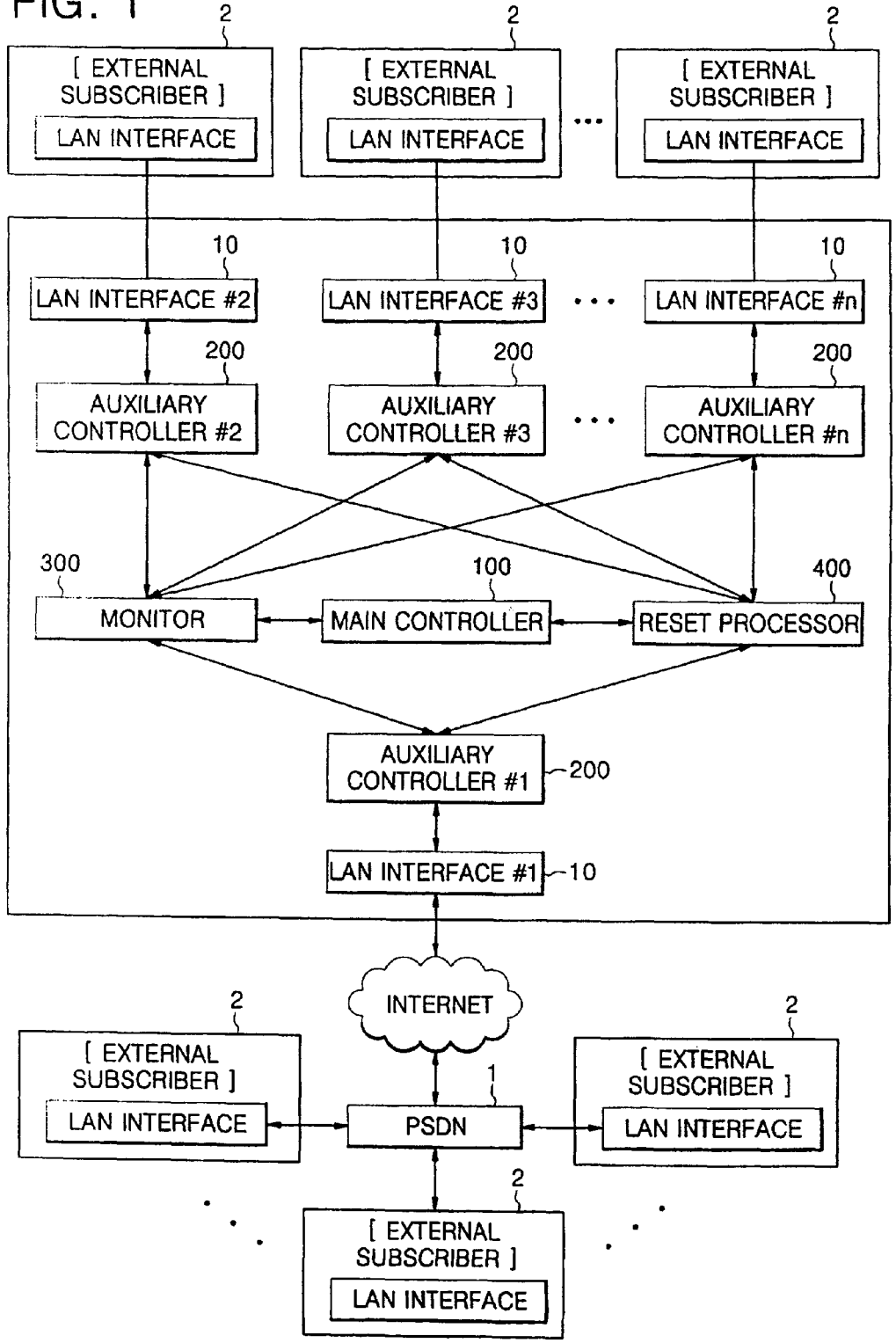
FIG. 1 is a block diagram of a Packet Switched Data Network (PSDN) having a Local Area Network (LAN) interface.

FIG. 1 is a block diagram of a PSDN having a LAN interface including a main controller 100 and at least one auxiliary controller 200.

The main controller 100 compares a transmitting period of a state-monitoring signal transmitted from the auxiliary controller 200 with a critical time. If the transmitting period of the state-monitoring signal exceeds the critical time, then the main controller 100 changes a state of the auxiliary controller 200 into an unusable state. The main controller 100 further includes a monitor 300 for receiving the state-monitoring signal transmitted from the auxiliary controller 200 and for storing the transmitting period of the state-monitoring signal, and a reset processor 400 for checking the state-monitoring signal transmitted from the auxiliary controller 200 and, if the transmitting period of the state-monitoring signal exceeds the critical time, forcibly resetting the auxiliary controller 200.

The auxiliary controller 200 controls all protocols of the LAN interface 10 via an interrupt routine.

Herein, looking at an operational procedure of performing an operation of the auxiliary controller 200, an interrupt is generated when the LAN interface 10 transmits/receives packet data, or performs an Internet Control Message Protocol (ICMP). The LAN interface 10 can communicate packet data with an external subscriber 2 having a LAN interface 10, or can be security-breached by an external subscriber.

The auxiliary controller 200 then transmits/receives packet data or performs the ICMP, using the interrupt routine generated. The auxiliary controller 200 performs all the interrupt routines transmitting/receiving packet data and performing the ICMP, respectively, and transmits a state-monitoring signal to the main controller 100.

At least one LAN interface 10 exists, and the auxiliary controller 200 is in a one-to-one correspondence with the LAN interface 10.

The auxiliary controller 200 sets the respective interrupt routines of the LAN interface 10 to one period, performs the interrupt routines, and then transmits the state-monitoring signal to the main controller 100. Alternatively, the auxiliary controller 200 sets all the interrupt routines performed in the LAN interface 10 to one period, performs all the interrupt routines, and then transmits the state-monitoring signal to the main controller 100.

First, the auxiliary controller 200 in a one-to-one correspondence with the LAN interface 10 processes packet data transmitted/received via the LAN interface 10 and the ICMP, and transmits the processed to the monitor 300 of the main controller 100. That is, when packet data is received from another PSDN, the auxiliary controller 200 generates an interrupt routine for processing packet data, and transmits a state-monitoring signal to the monitor 300 of the main controller 100 after receiving the packet data through a packet data processing protocol. The auxiliary controller 200 transmits the state-monitoring signal to the monitor 300 of the main controller 100 after processing the ICMP. The ICMP protocol is generally used for checking whether or not a network is connected to another host or gateway. A well-known program using this ICMP is referred to as a "ping program". A state of a network can be checked to some extent by using a ping program for looking at an operation of a particular gateway, host, router and so on, and a response time to an ICMP request.

A standard that the auxiliary controller 200 transmits the state-monitoring signal to the monitor 300 of the main controller 100 consists of state-monitoring signals that the auxiliary controller 200 transmits after performing the respective protocol and all protocol, respectively. The state-monitoring signal can be identified by the main controller 100 so that with the state-monitoring signal, the main controller 100 can independently control the protocols performed by the auxiliary controller. Accordingly, if packet data is congested from many external subscribers 2 to a certain LAN interface 10 of a packet data network 1, or traffic increases due to hacking by an external subscriber 2, the corresponding LAN interface 10 can generate an interrupt for processing the traffic. In this case, transmission of the state-monitoring signal, however, is delayed.

Then, the monitor 300 of the main controller 100 receives the state-monitoring signal transmitted from the auxiliary controller 200, and stores a transmitting period of the received state-monitoring signal.

Next, the main controller 100 compares the transmitting period of the state-monitoring signal for the auxiliary controller 200 with a predetermined critical time.

If the transmitting period of the state-monitoring signal is over the critical time, then the main controller 100 changes a state of the auxiliary controller 200 into an unusable state. On the contrary, if the transmitting period of the state-monitoring signal transmitted through a certain protocol is over the critical time, then the main controller 100 changes only the protocol whose transmitting period is over the critical time into an unusable state for a certain time.

Then, after some time, the main controller 100 changes the auxiliary controller 200 in unusable state into a usable state. The auxiliary controller 200 repeats the above operations to control the LAN interface 10.

By controlling only the auxiliary controller 200, the main controller 100 can manage other LAN interfaces 10. Also, if an overload is generated on a certain LAN interface 10, the main controller controls only the auxiliary controller 200 in charge of the corresponding LAN interface 10 thus to reduce the overload.

Figure 2:
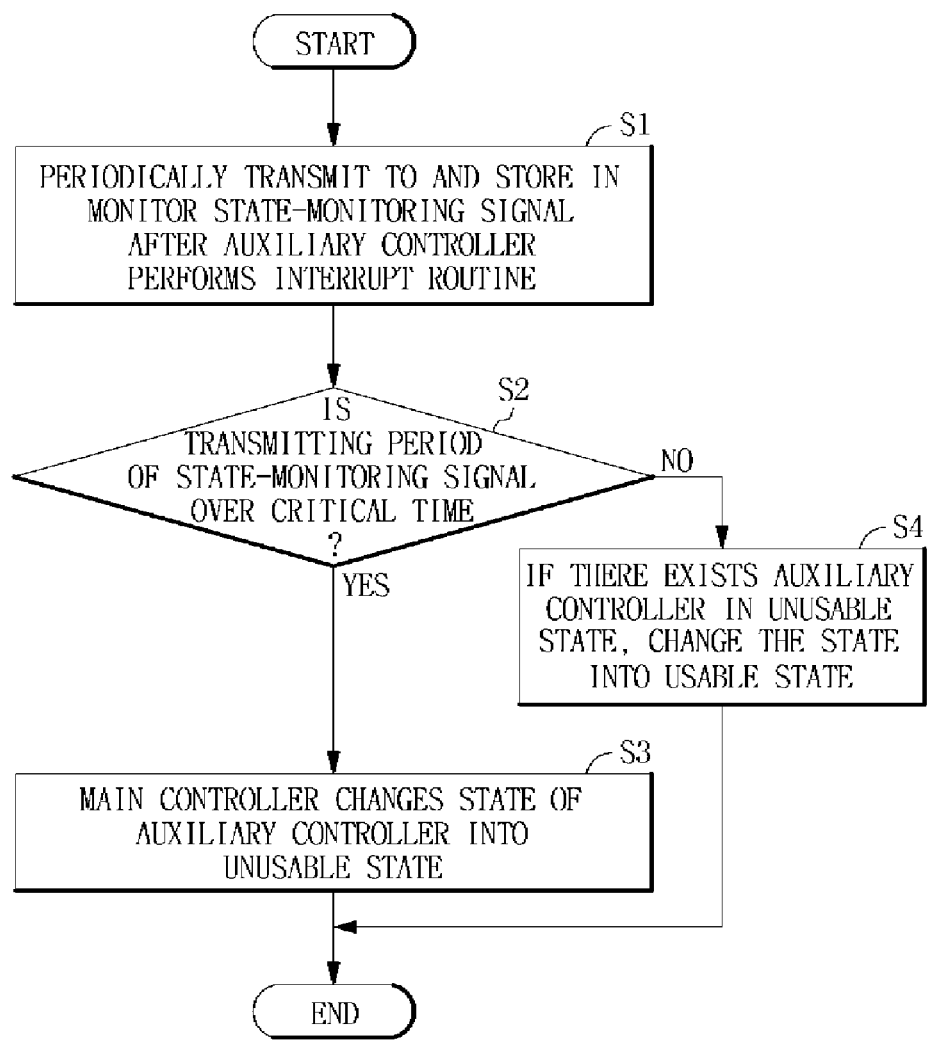
FIG. 2 is a flowchart of an overload control method in a PSDN having a LAN interface.

A control method of an overload in a PSDN having a LAN interface as constructed above is explained below with reference to FIG. 2.

First, the auxiliary controller 200 periodically transmits to and stores in the monitor 300 the state-monitoring signal after performing an interrupt routine (S1).

A detailed operation of the step S1 is explained below with reference to FIG. 3.

The auxiliary controller 200 processes packet data of the LAN interface 10 with an interrupt level, and transmits a corresponding state-monitoring signal (S11).

Then, the auxiliary controller 200 performs an ICMP process of the LAN interface 10 with an interrupt level, and transmits a corresponding state-monitoring signal (S12).

After performing all of the interrupt routines set in the LAN interface 10, the auxiliary transmits the state-monitoring signal to the monitor 300 of the main controller 100 (S13).

Then, the main controller 100 periodically checks the transmitting period of the state-monitoring signal stored in the monitor 300 to determine whether or not the transmitting period is over the critical time (S2).

If it is determined in the determining step (S2) that the transmitting period is over the critical time (YES), then the main controller 100 changes a state of the auxiliary controller 200 into an unusable state (S3).

The detailed operation of the changing step (S3) is explained as follows.

First, if the transmitting period of the state-monitoring signal transmitted after a certain protocol is performed is over the critical time, then the main controller 100 changes the state of the corresponding protocol into an unusable state for some time.

If the transmitting period of the state-monitoring signal transmitted after all protocols of the LAN interface are performed is over the critical time, then the main controller 100 changes the state of all the protocols of the auxiliary controller 200 into an unusable state for some time.

On the contrary, if it is determined in the determining step (S2) that the transmitting period of the state-monitoring signal is below the critical time (NO), then the main controller 100 periodically monitors the monitor 300, and changes the auxiliary controller 200 in an unusable state into a usable state after some time (S4).

If it is determined in the determining step (S2) that the state of the auxiliary controller 200 is usable, then the main controller 100 maintains the state of the auxiliary controller 200.

From the foregoing, in accordance with a PSDN having a LAN interface and an overload control method thereof, even when traffic is congested in a certain LAN interface or a certain LAN interface is infected with a virus to such an extent that the interface fails to operate, an overload in a main processor is prevented.

Furthermore, with the type of overload of the LAN interface, a protocol of an auxiliary controller can be independently controlled.

While the present invention has been described in conjunction with various embodiments, the present invention is not limited thereto and accordingly, many alternatives, modifications and variations will be apparent to persons skilled in the art in light of the foregoing detailed description. The foregoing description is intended to embrace all such alternatives and variations falling with the spirit and scope of the appended claims.

What is claimed is:

1. A Packet Switched Data Network (PSDN) comprising a Local Area Network (LAN) interface, the PSDN comprising:
    an auxiliary controller configured to process packet data according to protocols of the LAN interface via an interrupt routine, and to transmit a state-monitoring signal after processing the packet data according to the protocols; and
    a main controller to compare a transmitting period of the state-monitoring signal transmitted by the auxiliary controller with a critical time, and to change a state of the auxiliary controller from a usable state to an unusable state or from the unusable state to the usable state in accordance with a result of the comparison,
    wherein the auxiliary controller is configured to transmit the state-monitoring signal to the main controller for the interrupt routine to process the packet data according to the protocols in the LAN interface.

2. The PSDN according to claim 1, wherein the auxiliary controller is configured to transmit the state-monitoring signal to the main controller after performing the interrupt routine to process the packet data according to the protocols in the LAN interface.

3. The PSDN according to claim 1, wherein the main controller further comprises a monitor configured to store the transmitting period of the state-monitoring signal after receiving the state-monitoring signal transmitted from the auxiliary controller.

4. The PSDN according to claim 3, wherein the main controller further comprises a reset processor configured to compare the transmitting period of the state-monitoring signal stored in the monitor with the critical time, and if the period is over the critical time, to reset the auxiliary controller.

5. An overload control method of a Packet Switched Data Network (PSDN) comprising a Local Area Network (LAN) interface, the method comprising:
   periodically transmitting a state-monitoring signal to a monitor for storage after performing an interrupt routine with an auxiliary controller;
   determining whether or not a transmitting period of the stored state-monitoring signal is over a critical time with a main controller; and
   if the transmitting period of the state-monitoring signal stored in the monitor is determined to be over the critical time, then the main controller changes a state of the auxiliary controller into an unusable state, and if the transmitting period of the state-monitoring signal is determined to be below the critical time, the main controller determines whether the state of the auxiliary controller is in an unusable state, and if the auxiliary controller is determined to be in the unusable state, the main controller changes the unusable state of the auxiliary controller to a usable state after a period of time,
   wherein periodically transmitting the state-monitoring signal to a monitor for storage after performing the interrupt routine further comprises transmitting the state-monitoring signal after performing all interrupt routines of the LAN interface.

6. The method according to claim 5, further comprising allowing the main controller to maintain the state of the auxiliary controller if the transmitting period of the state-monitoring signal is below the critical time and the auxiliary controller is in a usable state.

7. The method according to claim 5, wherein periodically transmitting the state-monitoring signal to the monitor for storage after performing the interrupt routine comprises:
   transmitting or receiving packet data and transmitting the corresponding state-monitoring signal to the monitor in response to an interrupt routine for transmitting or receiving packet data generated from the LAN interface; and
   performing an Internet Control Message Protocol (ICMP) process to transmit the corresponding state-monitoring signal to the monitor in response to an interrupt routine for processing an ICMP generated by the LAN interface.

8. The method according to claim 5, wherein periodically transmitting the state-monitoring signal to the monitor for storage after performing the interrupt routine comprises changing a protocol processing transmission or receipt of packet data among protocols of the auxiliary controller into an unusable state if the transmitting period of the state-monitoring signal transmitted after the auxiliary controller transmits or receives the packet data is over the critical time.

9. The method according to claim 6, wherein periodically transmitting the state-monitoring signal to the monitor for storage after performing the interrupt routine comprises changing an Internet Control Message Protocol (ICMP) among protocols of the auxiliary controller into an unusable state if the transmitting period of the state-monitoring signal transmitted after the auxiliary controller process the ICMP is over the critical time.

10. The method according to claim 5, wherein periodically transmitting the state-monitoring signal to the monitor for storage after performing the interrupt routine comprises resetting the auxiliary controller if the transmitting period of the state-monitoring signal transmitted after performing all interrupt routines during one period of the LAN interface is over the critical time.

\* \* \* \* \*